US012647001B2

(12) United States Patent
Birkmayer

(10) Patent No.: US 12,647,001 B2
(45) Date of Patent: Jun. 2, 2026

(54) ASSEMBLY FOR AN ELECTRIC MACHINE

(71) Applicant: Rolls-Royce Deutschland Ltd & Co KG, Blankenfelde-Mahlow (DE)

(72) Inventor: Wolfram Birkmayer, Hirschaid (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 361 days.

(21) Appl. No.: 18/570,801

(22) PCT Filed: Jun. 15, 2022

(86) PCT No.: PCT/EP2022/066369
§ 371 (c)(1),
(2) Date: Dec. 15, 2023

(87) PCT Pub. No.: WO2022/268613
PCT Pub. Date: Dec. 29, 2022

(65) Prior Publication Data
US 2024/0283331 A1 Aug. 22, 2024

(30) Foreign Application Priority Data
Jun. 25, 2021 (DE) ..................... 10 2021 206 595.3

(51) Int. Cl.
*H02K 11/27* (2016.01)
*H02K 1/14* (2006.01)
*H02K 21/20* (2006.01)

(52) U.S. Cl.
CPC ............. *H02K 11/27* (2016.01); *H02K 1/148* (2013.01); *H02K 21/20* (2013.01)

(58) Field of Classification Search
CPC ........ H02K 11/27; H02K 1/148; H02K 21/20; H02K 11/33; H02K 11/20
See application file for complete search history.

(56) References Cited

U.S. PATENT DOCUMENTS

2020/0228030 A1* 7/2020 Bourse ................ H02M 7/5387
2020/0336058 A1* 10/2020 Katou ....................... H02K 3/28
(Continued)

FOREIGN PATENT DOCUMENTS

CA 2169515 A1 * 8/1997 .............. H02K 3/28
DE 3015135 A1 11/1980
(Continued)

OTHER PUBLICATIONS

International Search Report & Written Opinion for International App. No. PCT/EP2022/066369 mailed Oct. 13, 2022, pp. 1-5.
(Continued)

*Primary Examiner* — Bickey Dhakal
(74) *Attorney, Agent, or Firm* — Lempia Summerfield Katz LLC

(57) ABSTRACT

An assembly for an electric machine includes: a body; a plurality of teeth fixed to the body; a plurality of tooth windings, wherein each tooth winding includes a first electrical conductor and a second electrical conductor that are wound around the same tooth at least at one winding section along a winding axis and thereby alternate in the direction of the winding axis; and a differential protection device with a plurality of sensors, (e.g., current sensors), wherein each sensor is configured to detect a voltage at, and/or the strength of a current through, the first conductor or the second conductor at least at two points of a tooth winding of the plurality of tooth windings.

19 Claims, 13 Drawing Sheets

(56)  References Cited

U.S. PATENT DOCUMENTS

2021/0281196 A1*  9/2021  Shimizu ................... H02P 5/74
2022/0190770 A1*  6/2022  Ritchey ................. H02K 1/278

FOREIGN PATENT DOCUMENTS

DE        102017217751 A1    4/2019
EP            2839575 B1    9/2016
GB             624922 A    6/1949

OTHER PUBLICATIONS

German Office Action for German Application No. 10 2021 206 595.3 mailed Mar. 16, 2022, pp. 1-14.

* cited by examiner

ASSEMBLY FOR AN ELECTRIC MACHINE

The present patent document is a § 371 nationalization of PCT Application Serial No. PCT/EP2022/066369, filed Jun. 15, 2022, designating the United States, and this patent document also claims the benefit of German Patent Application No. 10 2021 206 595.3, filed Jun. 25, 2021, which are incorporated by reference in their entireties.

TECHNICAL FIELD

The present disclosure relates in particular to an assembly for an electric machine, to an electric machine having such an assembly, and to an aircraft having such an electric machine.

BACKGROUND

Such assemblies include a body, e.g. in the form of a laminated core, a plurality of teeth anchored on the body, and a plurality of tooth windings wound around the teeth. By applying voltages to the tooth windings, particularly voltages that vary over time, magnetic fields are generated that may cause a relative movement between the assembly and another assembly. The assembly may be a stator and the other assembly may be a rotor.

Especially in multiphase rotating field machines, (e.g., having a permanently excited rotor), it is problematic when a winding short circuit occurs inside a tooth winding. In particular in such electric machines, the problem exists that, in the event of a winding short circuit between turns during intended operation, a large electrical current may be induced, which current may result in thermal destruction of the tooth windings. This is particularly relevant not only, but particularly, in aircraft in which, e.g., permanently excited rotating-field machines are used.

SUMMARY AND DESCRIPTION

The object of the present disclosure is to specify a further improved assembly for an electric machine. The scope of the present disclosure is defined solely by the appended claims and is not affected to any degree by the statements within this summary. The present embodiments may obviate one or more of the drawbacks or limitations in the related art.

According to one aspect, an assembly for an electric machine includes: a body, a plurality of teeth anchored on the body, a plurality of tooth windings, and a differential protection device. Each tooth winding has a first electrical conductor and a second electrical second conductor. The first and second electrical conductors are each wound around the same tooth at least at a winding portion along a winding axis, alternating in the direction of the winding axis. The differential protection device includes a plurality of sensors, (e.g., current sensors), which detect a voltage on and/or a current strength through the first conductor or the second conductor at two or more points of a tooth winding.

Such an assembly makes it possible to reliably detect a turn short circuit between adjacent turns of a winding portion, (e.g., between the corresponding first and second electrical conductor), in order to initiate countermeasures, (e.g., switching off a power supply), and to shut down an electric machine with the assembly in safe operation in order to avoid dangerous operating states. At least at the winding portion or the winding portions (optionally completely), the first electrical conductor and the associated second electrical conductor are electrically insulated from each other. The current sensor includes, for example, a Hall sensor and/or a loop sensor. This enables detection of a fault based on current signals using two separate electrical conductors.

Optionally, the differential protection device includes current sensors configured to measure a current strength through the first electrical conductor at two or more points of the first electrical conductor, which are electrically connected to one another via the at least one winding portion, and/or current sensors configured to measure a current strength through the second electrical conductor at two or more points of the second electrical conductor, which are electrically connected to one another via the at least one winding portion. A short circuit in the at least one winding portion may be reliably detected from the difference in the measured current strengths on both sides of the at least one winding portion.

In one embodiment, signals from the current sensors for measuring the current strength through the first electrical conductor are provided to a comparator and/or signals from the current sensors for measuring the current strength through the second electrical conductor are provided to a comparator. This allows a particularly fast response time. The assembly may include one or more comparators. The comparator or each of the comparators receives signals from two of the current sensors and compares them with each other. The comparator (or comparators) provides the result of the comparison as a differential signal.

The assembly may include an analog or digital multiplexer to which the differential signals of several comparators are provided. This enables several tooth windings to be monitored in parallel.

In an alternative or additional embodiment, the differential protection device includes a current sensor configured to measure an effective current strength through the first conductor at two points of the first conductor, which are electrically connected to one another via the at least one winding portion, and/or a current sensor configured to measure an effective current strength through the second conductor at two points of the second electrical conductor, which are electrically connected to one another via the at least one winding portion. This enables an evaluation with particularly few components, in particular without an additional comparator and with particularly few current sensors. The two points of the first and/or the second electrical conductor may be arranged in such a way that a current flows through the corresponding electrical conductor at the two points in antiparallel directions in comparison with one another. The two points of the first and/or second electrical conductor may be arranged adjacent to each other, in particular, resting against each other. Optionally, two end portions of the same electrical conductor are routed through the same current sensor.

Each electrical conductor of the first and/or second electrical conductors of the tooth windings may be electrically connectable or connected to an inverter. This enables the use of a DC voltage source such as a battery.

The assembly includes, e.g., (in particular exactly) three tooth windings, each winding for one phase of a three-phase AC current. The assembly thus includes, e.g., six (first and second) electrical conductors in total.

All the first electrical conductors of each tooth winding may be electrically connected to one another at a (first) star point. Furthermore, all the second electrical conductors of each tooth winding may be electrically connected to one another at a (second) star point. This enables a particularly simple structure.

The differential protection device may include one or more voltage sensors as sensor(s). Optionally, the voltage sensor (or the voltage sensors) is (are) connected in such a way that the voltage sensor(s) may measure a voltage at one or both star points, e.g., with reference to an earth potential. Alternatively, or additionally, a voltage sensor is connected to both star points in order to measure a voltage between the star points.

In particular, the first and second electrical conductors are arranged in a bifilar manner (at least on at least one winding portion). Due to the fact that the turns of the first and second electrical conductors are arranged in a bifilar manner, a winding short circuit between turns may thus initially occur between the first and second electrical conductors. If an electrical charge is applied to the partial tooth windings formed by the first and second electrical conductors, the effect of a winding short circuit may therefore be considerably reduced.

For example, each electrical conductor of the first electrical conductors of the tooth windings runs around each tooth of a plurality of teeth and/or each electrical conductor of the second electrical conductors of the tooth windings runs around each tooth of a plurality of teeth, in particular, in each case around the same teeth as the associated first electrical conductor.

According to one aspect, there is provision for an electric machine. The electric machine includes the assembly according to any configuration described herein, (e.g., as a stator). The electrical machine further includes a further assembly, (e.g., as a rotor), wherein the assembly and the further assembly are movable relative to each other, in particular rotatable.

In the electric machine, the stator provides, e.g., a circular opening for accommodating the rotor. The rotor is arranged in the opening, e.g., in a rotatably mounted manner, wherein an air gap is formed between the rotor and the stator. This construction is also referred to as an internal rotor. Alternatively, there is provision for a construction in which the rotor radially surrounds the stator. Such constructions are also called external rotors.

The electric machine is a device that converts electrical energy into mechanical energy, in particular kinetic energy, in a motor mode, and/or mechanical energy into electrical energy in a generator mode.

The movement may be a rotational movement performed by the rotor. The stator may be arranged in a rotationally fixed manner with respect to a mount bearing the electric machine. A rotational movement is therefore in particular a rotational movement of the rotor with respect to the stator.

The electric machine may include an inverter, in particular with several inverter units, each unit for one electrical phase of a multi-phase AC voltage. The inverter units are optionally electrically connected to the first electrical conductors of each tooth winding, and/or the inverter units are electrically connected to the second electrical conductors of each tooth winding. All inverter units may be supplied with energy from the same energy source.

According to one aspect, a vehicle, (e.g., an aircraft), is disclosed. The vehicle includes the electric machine according to any configuration described herein, in particular for driving a thrust-generating apparatus, e.g. a propeller. The advantages of the electric machine described herein apply especially to a vehicle, in particular an aircraft. However, the assembly may also be used in a gas pump, in a marine engine, in a wind turbine, or in a generator.

BRIEF DESCRIPTION OF THE DRAWINGS

Embodiments will now be described by way of example with reference to the figures in which.

DETAILED DESCRIPTION

Figure 1:
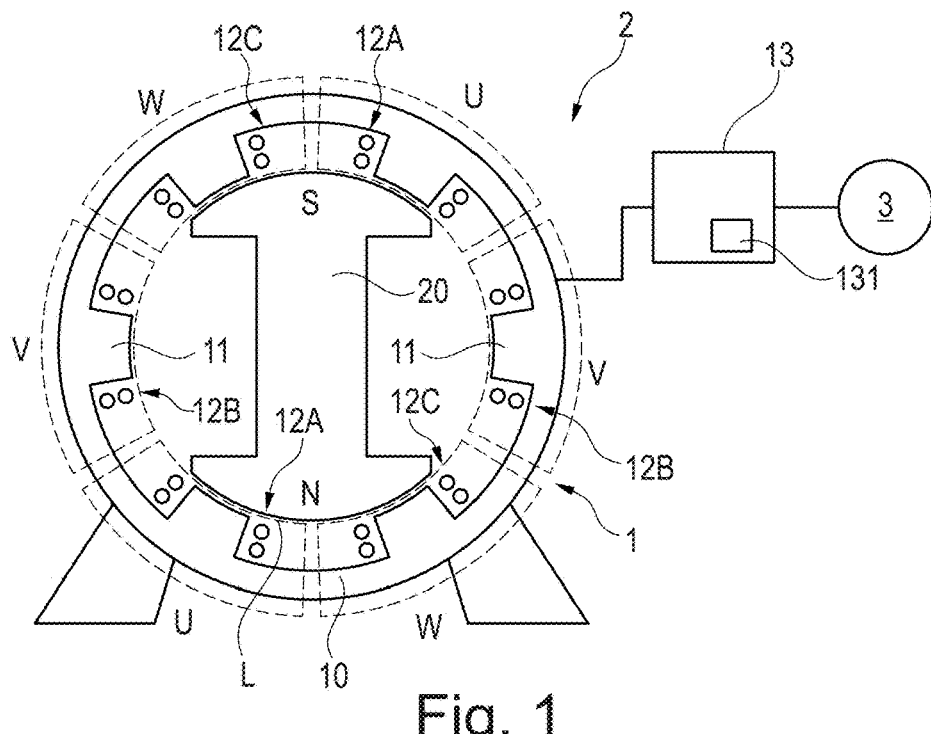
FIG. 1 depicts a schematic sectional illustration of an example of a basic design of a permanently excited, three-phase electric machine in the form of an internal rotor.

FIG. 1 shows a schematic sectional illustration of a rotating electric machine 2 in the form of a permanently excited synchronous machine. In FIG. 1, the electric machine 2 is in the form of an internal rotor. The electric machine 2 includes an assembly in the form of a stator 1 that has an opening, in particular a through-opening, which is not denoted, in which a further assembly in the form of a rotor 20 is arranged in a rotatably mounted manner.

The stator 1 includes a body 10 in the form of a laminated core, on which teeth are anchored, which are referred to below as stator teeth 11. The stator teeth 11 are aligned with an air gap L between the body 10 of the stator 1 and the rotor 20. The stator teeth 11 protrude radially from the body 10, in the present case radially inward. The stator 1 has a stator winding that includes a plurality of tooth windings 12A-12C. The stator winding in the present case is designed for three-phase operation, (connected to a three-phase AC voltage having phases U, V, W). During intended operation of the electric machine 2, the AC voltage is accordingly applied to the stator winding.

The rotor 20 is in the form of a salient-pole rotor that includes permanent magnets for providing the magnetic flux. In the present configuration, there is provision for the rotor 20 to have exactly one magnetic north pole N and one magnetic south pole S. In alternative configurations, there may also be provision for more magnetic poles in alternation in the circumferential direction transverse to an axis of rotation of the rotor 20 (relative to the stator 1).

The rotor 20 is rotatably mounted. As a result of the three-phase AC voltage, the phases U, V, W thereof each being phase-shifted by 120°, a magnetic rotating field is generated during intended operation, which magnetic rotating field interacts with the permanently excited magnetic field provided by the rotor 20 such that a corresponding rotational movement of the rotor 20 in relation to the stator 1 may be brought about during operation of the motor. In certain examples, the electric machine 2 is used as a drive motor for a propeller of an aircraft. The portions of the stator winding assigned to the respective phases U, V, W are schematically illustrated in FIG. 1. One tooth winding 12A-12C is in each case respectively assigned to one of the phases U, V, W.

The stator winding of the electric machine 2 is connected to an inverter 13 of three-phase design. The inverter 13 provides the electric AC voltage with the three phases U, V, W. The inverter 13 obtains the electric energy required for the intended operation from an energy source 3 connected to the inverter 13. In the present configuration, the energy source 3 is a DC voltage source which provides electrical energy from a suitable electrical energy store, for example, a rechargeable battery or the like. Alternatively, or additionally, a fuel cell and/or the like or, in the case of stationary applications, an energy supply from a public energy supply network may be provided, for which purpose a rectifier for converting an alternating current of the public energy supply network into direct current may be provided.

The inverter 13 has inverter units assigned for providing the phases U, V, W, which inverter units are explained in more detail further below in connection with FIG. 5, for example. In this case, each inverter unit has its own half-bridge circuit. The half-bridge circuits are connected to a DC link circuit, which is not illustrated any further in FIG. 1, of the inverter 13 in order to thus be supplied with electrical energy. The DC link circuits may have a voltage of 25 V or more, 100 V or more, or in the range of 800 to 3000 V.

The half-bridge circuit has a series circuit including two electronic switching elements (e.g., transistors) that are connected to the link circuit DC voltage of the inverter 13. The electronic switching elements are operated in a clock mode, as explained in more detail below in connection with FIG. 9, which provides clock patterns in the manner of a PWM signal, for example. The corresponding phase U, V, W of the three-phase AC voltage is then available at a respective center tap of the half-bridge circuits. Appropriate filtering is carried out by the inductance of the tooth windings 12A-12C, with the result that an appropriate AC current is established for each phase U, V, W, which AC current may be virtually sinusoidal if the inverter units are suitably controlled.

For the sake of simplicity, the inverter 13 is counted here as part of the assembly, (e.g., the stator 1), and thus as part of the electric machine 2, but may also be described together with it as an electrical drive device.

Figure 2:
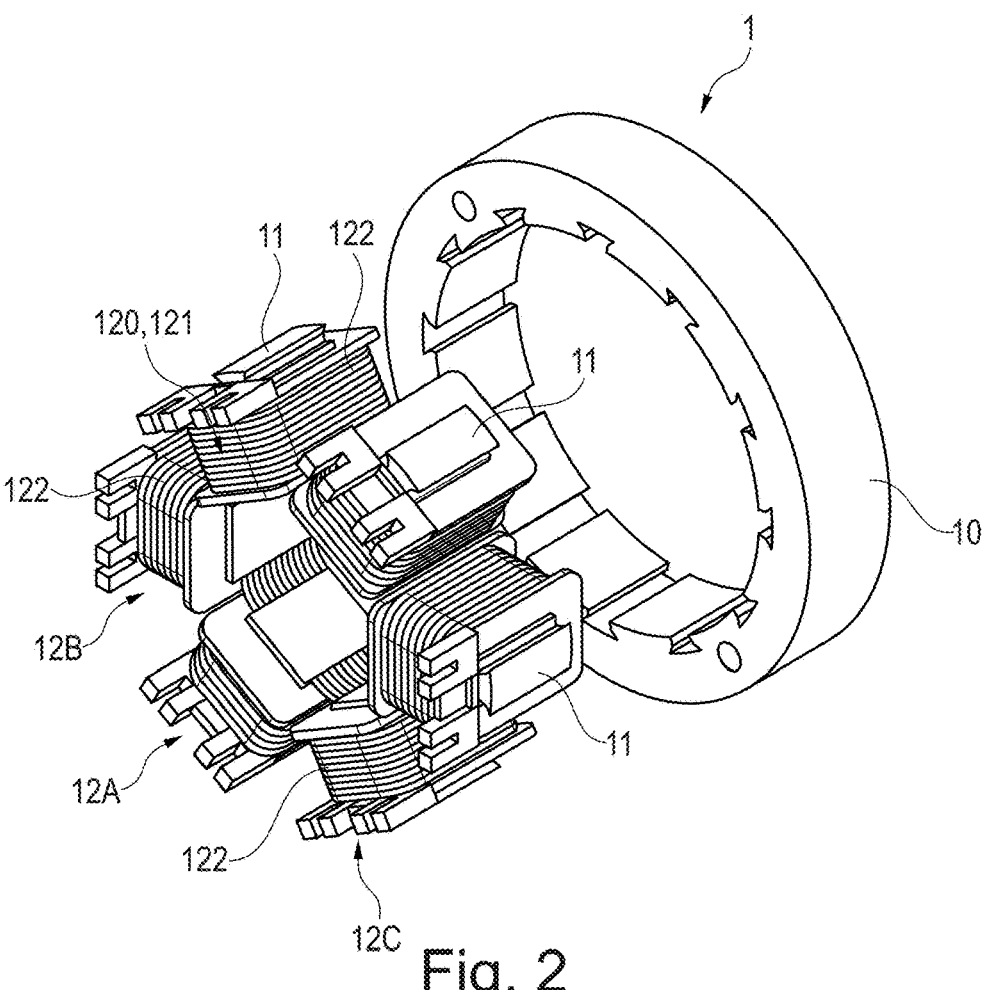
FIG. 2 depicts a schematic, perspective exploded view of an example of a design of an assembly in the form of a stator of the electric machine according to FIG. 1 with tooth windings.

FIG. 2 shows a schematic exploded illustration of the stator 1 of the electric machine 2. The stator 1 has the body 10 in which stator teeth 11 may be joined together with the annular body 10 by a mechanical connection and may thus be fixed thereon, in particular, mechanically fixed thereon. Alternatively, the stator teeth 11 may be formed in one piece with the body 10.

The stator teeth 11 are fitted with respective winding portions 122 of the tooth windings 12A-12C. The stator winding has a plurality of tooth windings 12A-12C, (e.g., exactly three windings). A respective one of the tooth windings 12A-12C may be arranged at least on one of the stator teeth 11. In the present case, each tooth winding 12A-12C extends over a plurality of stator teeth 11, (e.g., specifically two opposite stator teeth). For this purpose, each tooth winding 12A-12C may have at least one winding portion 112 or a plurality of winding portions 122 (e.g., two winding portions). Each winding portion 122 surrounds (e.g., exactly) one stator tooth 11.

Each tooth winding 12A-12C has a respective first electrical conductor 120, which at each winding portion 122 is arranged in a plurality of turns circumferentially around the respective stator tooth 11. Between the winding portions 122, the first electrical conductor 120 includes one or more corresponding connecting portions via which the portions of the first electrical conductor 120 at the winding portions 122 are electrically connected to each other.

Each tooth winding 12A-12C further has a respective second electrical conductor 121 that likewise at each winding portion 122 is arranged in a plurality of turns circumferentially around the respective stator tooth 11. Between the winding portions 122, the second electrical conductor 121 includes one or more corresponding connecting portions via which the portions of the second electrical conductor 121 at the winding portions 122 are electrically connected to each other.

The first electrical conductors 120 and the second electrical conductors 121 each have end portions to which they are connected in a manner described in more detail below. Between the respective end portions, the first electrical conductors 120 and the second electrical conductors 121 are electrically insulated from each other. The tooth windings 12A-12C are connected up in the electric machine 2 as appropriate such that the three-phase connection to the inverter 13 is present.

Figure 3:
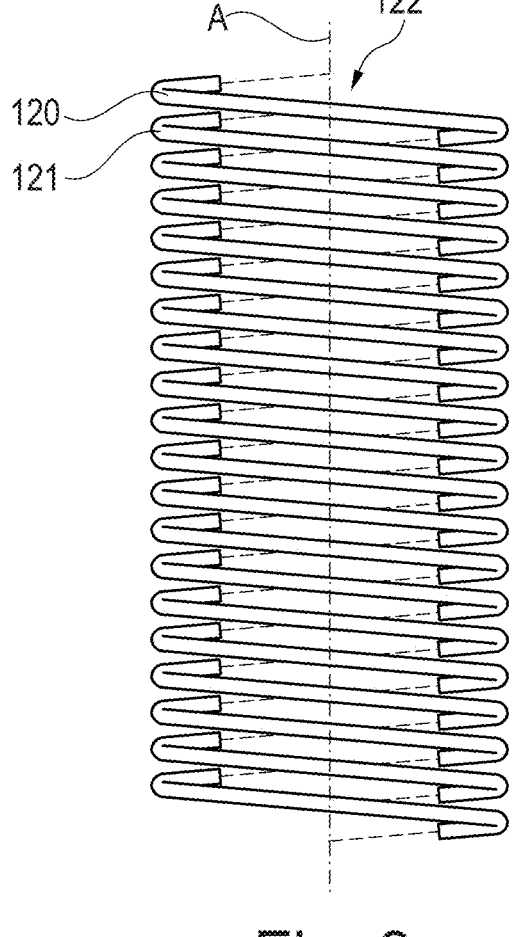
FIG. 3 depicts a schematic illustration of an example of part of a tooth winding of the assembly according to FIG. 2, in which turns of a first and second electrical conductor are arranged in a bifilar manner.

FIG. 3 shows a schematic illustration of a winding portion 122 of one of the tooth windings 12A-12C. The first electrical conductor 120 in this case is wound around the stator tooth 11, which is not illustrated in FIG. 3. The winding on the stator tooth 11 extends here around and along a winding axis A. In the present case, the winding is configured in the form of an elongate coil along the winding axis A. Depending on the configuration and construction, there may also be provision for a multilayer winding to be provided in order to be able to achieve, for example, a correspondingly high magnetic potential with a predefined electrical current.

Furthermore, the winding portion 122 of the tooth winding 12A-12C includes the respective second electrical conductor 121 that is electrically insulated from the first electrical conductor 120. The second electrical conductor 121 also has a plurality of turns arranged circumferentially around the same stator tooth 11, so that the winding on the stator tooth 11 extends around and along the winding axis A. The respective turns of the first and second electrical conductors 120, 121 are arranged in a bifilar manner. In other words, one turn of the first electrical conductor 120 is arranged between two adjacent turns of the second electrical conductor 121 (and vice versa) along the winding axis A of the winding portion 122 (with the exception of the outermost two turns). This has the advantage that, in the event of a turn short circuit between two adjacently arranged turns, the turn short circuit occurs between the first electrical conductor 120 and the second electrical conductor 121. A turn short circuit thus does not occur inside a winding of the same electrical conductor. This makes it possible to prevent large currents in the case of a turn short circuit and therefore large thermal and electrical stresses.

Optionally, each first electrical conductor 120 and/or each second electrical conductor 121 includes two individual conductors insulated from each other.

Figure 4:
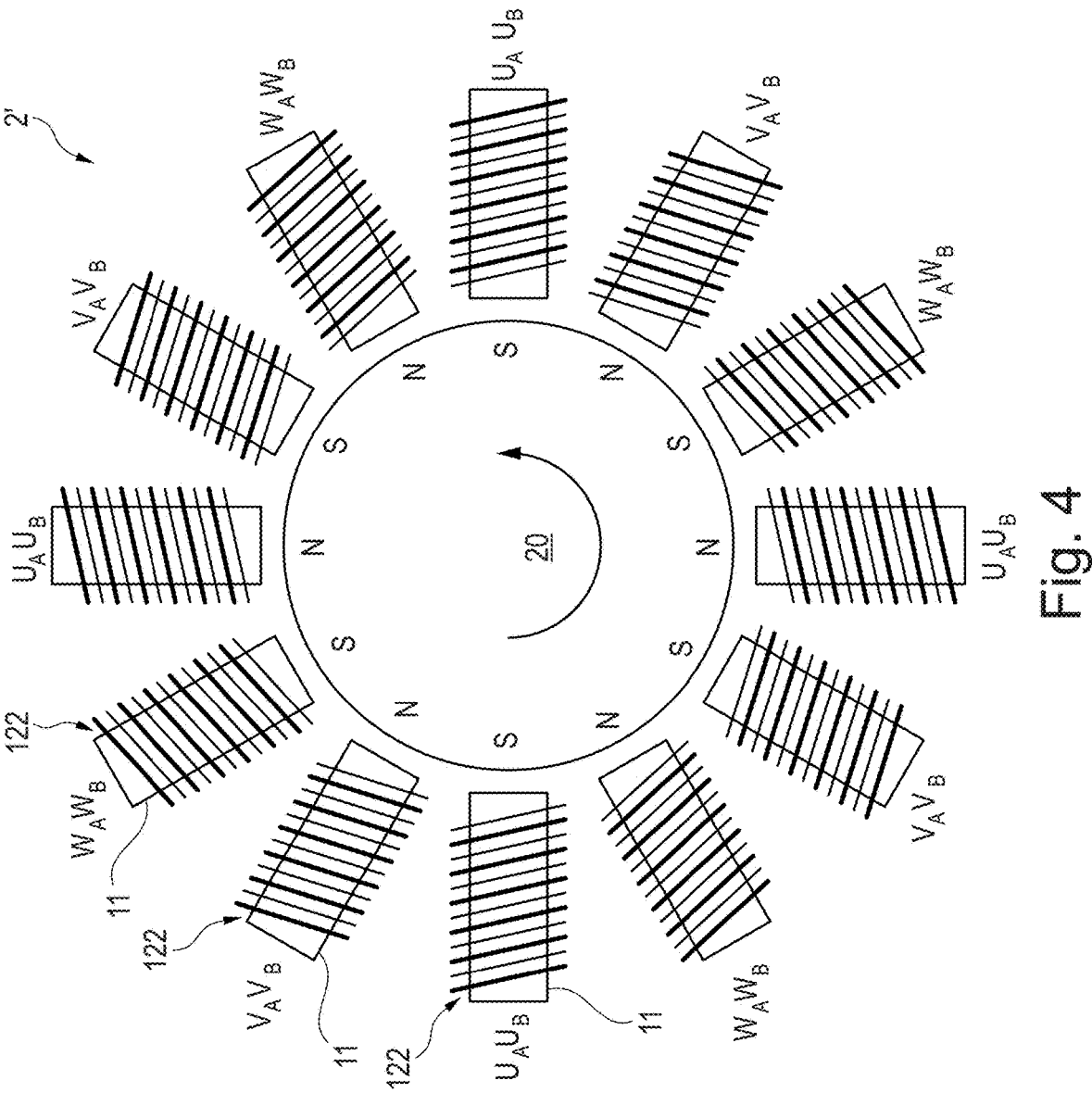
FIG. 4 depicts a schematic illustration of an example of a permanently excited electric machine for operation at a three-phase AC voltage.

FIG. 4 shows a schematic illustration of an electric machine 2' in the form of a synchronous machine that, in contrast to the electric machine 2 according to FIGS. 1 and 2, now has a twelve-pole rather than a six-pole design. The corresponding stator therefore has twelve stator teeth 11. These are arranged equidistantly in the circumferential direction in the present case. The rotor 20 is again arranged in a through-opening formed by the stator, which rotor likewise has a twelve-pole design in this configuration and therefore provides six north poles N and six south poles S arranged in alternation in the circumferential direction. Here too, the magnetic flux provided by the rotor 20 is provided by permanent magnets arranged, e.g., in the region of the outer circumference of the rotor 20.

Each tooth of the stator teeth 11 is also equipped here with a winding portion 122 of one of the three tooth windings. Each tooth winding of the three tooth windings again has a respective first electrical conductor and a respective second electrical conductor (illustrated by different line thicknesses in FIG. 4 purely for the purposes of illustration) that are wound onto the respective stator teeth 11 in a bifilar manner. This electric machine 2' is likewise designed to be supplied with a three-phase AC voltage, wherein each of the phases is again denoted using U, V, W.

Figure 5:
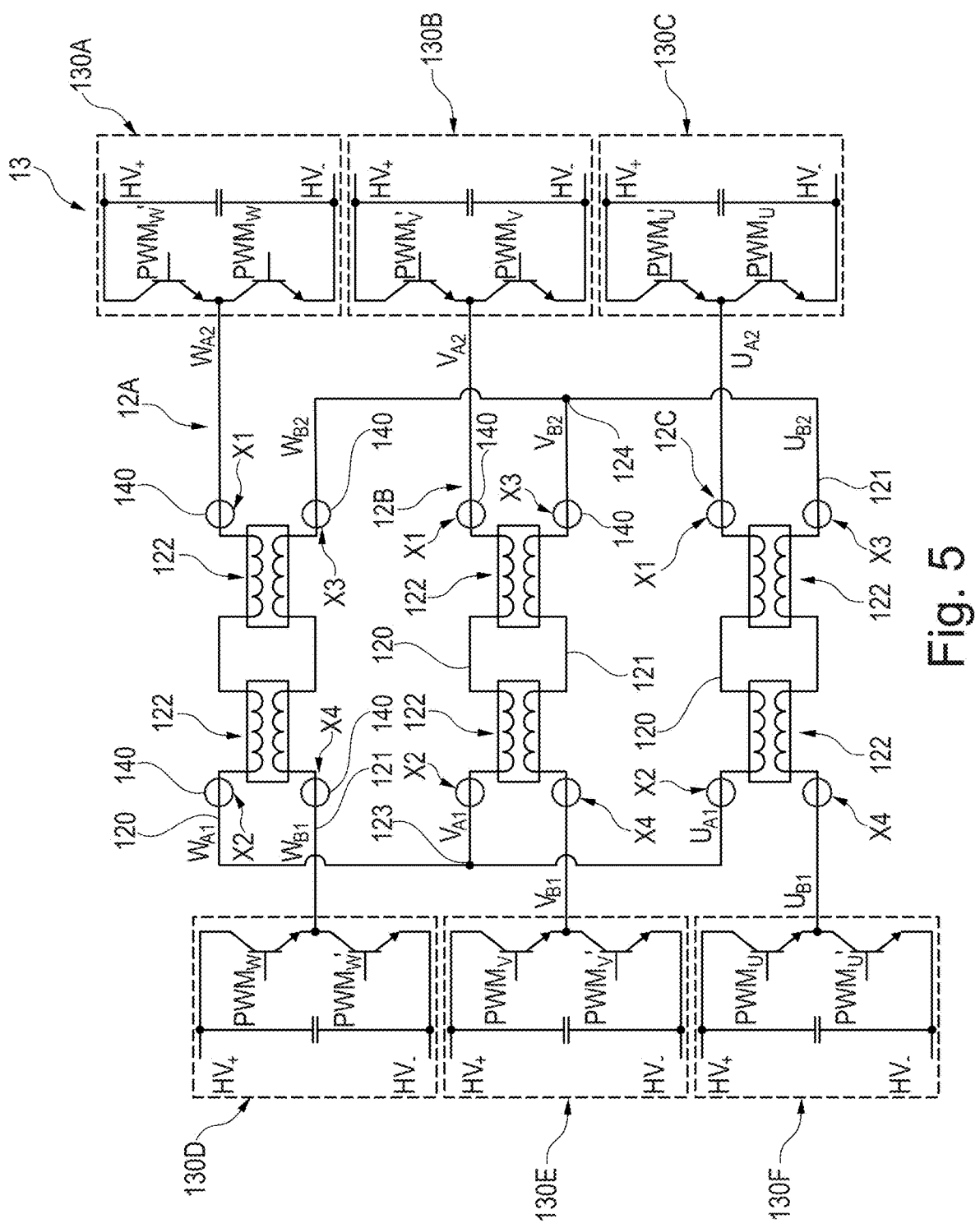
FIGS. 5 and 6 depict schematic circuit diagram illustrations of examples of tooth windings and inverter units of an inverter of the electric machine according to FIG. 2 and FIG. 4, respectively.

FIG. 5 shows an electrical interconnection of the tooth windings 12A-12C and the inverter units 130A-130F of the inverter 13 of the electric machine 2 according to FIG. 1.

The first electrical conductors 120 (e.g., three first electrical conductors) of the tooth windings 12A-12C form a first winding system and the second electrical conductors 121 (e.g., three second electrical conductors) of the tooth windings 12A-12C form a second winding system. The first winding system is connected to three inverter units 130A-130C. Each first electrical conductor 120 is connected with an end portion WA2, VA2, UA2 to one of the inverter units 130A-130C. The respective other end portions WA1, VA1, UA1 of the first electrical conductors 120 are electrically connected to each other at a first star point 123. The second winding system is connected to three inverter units 130D-130F. Each second electrical conductor 121 is connected with an end portion WB1, VB1, UB1 to one of the inverter units 130D-130F. The respective other end portions WB2, VB2, UB2 of the second electrical conductors 121 are electrically connected to each other at a second star point 124.

The inverter 13 thus includes six inverter units 130A-130F, two for each of the three phases U, V, W, and of these two inverter units, one each for the first winding system and one for the second winding system. As already described, each inverter unit 130A-130D has a half-bridge circuit. An optional capacitor is used as a low-pass filter in each case.

A (e.g., same) DC voltage (designated by HVA+ and HVA−) is applied to the inverter units 130A-130D of the inverter 13. For example, the DC voltage is 25 V or more, 100 V or more, or in a range of 800 to 3000 V.

Furthermore, all six winding portions 122 for the six stator teeth 11 are shown, wherein each winding of the first and second electrical conductors 120, 121 is illustrated only schematically.

Initially, the tooth winding 12A for a first phase W will be considered. The tooth winding 12A includes a first electrical conductor 120 and a second electrical conductor 121. Both electrical conductors 120, 121 extend over winding portions 122 on the same (e.g., two) stator teeth 11 but are insulated from one another. Both electrical conductors 120, 121 have the aforementioned two end portions WA1, WA2, WB1, WB2. Both electrical conductors 120, 121 are free of junctions between their end portions WA1, WA2, WB1, WB2. The electrical conductors 120, 121 each establish an electrical connection between the respective two end portions WA1, WA2, WB1, WB2. The winding portions 122 of the tooth winding 12A lie between the end portions WA1, WA2, WB1, WB2 of the electrical conductors 120, 121.

One end portion WA2 of the first electrical conductor 120 is electrically connected to a first inverter unit 130A of the inverter 13, and the other end portion WA1 of the first electrical conductor is electrically connected to the first star point 123. One end portion WB1 of the second electrical conductor 121 is electrically connected to a fourth inverter unit 130D of the inverter 13, and the other end portion WB2 of the second electrical conductor is electrically connected to a second star point 124.

The end portions of the first electrical conductor 120 of the tooth winding 12B for a second phase V are denoted using VA1 and VA2. One end portion VA2 of the first electrical conductor 120 is electrically connected to the inverter 13, specifically to a second inverter unit 130B thereof, and the other end portion VA1 of the first electrical conductor is electrically connected to the first star point 123.

The end portions of the second electrical conductor 121 of the tooth winding 12B for the second phase V are correspondingly denoted using VB1 and VB2. One end portion VB1 of the second electrical conductor 121 is electrically connected to the inverter 13, specifically to a fifth inverter unit 130E thereof, and the other end portion VB2 of the second electrical conductor is electrically connected to the second star point 124.

The end portions of the first electrical conductor 120 of the tooth winding 12C for a third phase U are denoted using UA1 and UA2. One end portion UA2 of the first electrical conductor 120 is electrically connected to the inverter 13, specifically to a third inverter unit 130C thereof, and the other end portion UA1 of the first electrical conductor is electrically connected to the first star point 123.

The end portions of the second electrical conductor 121 of the tooth winding 12C for the third phase U are correspondingly denoted using UB1 and UB2. One end portion UB1 of the second electrical conductor 121 is electrically connected to the inverter 13, specifically to a sixth inverter unit 130F thereof, and the other end portion UB2 of the second electrical conductor is electrically connected to the second star point 124.

The stator 1 further includes a differential protection device described in more detail below. The differential protection device includes a plurality of current sensors 140. Each current sensor 140 is arranged on the first or second electrical conductor 120, 121 and measures the current strength of the current flowing therein. In certain examples, one current sensor 140 is disposed at two or more points of at least one tooth winding or each tooth winding 12A-12C.

In the example shown, four current sensors are provided per tooth winding 12A-12C. The current sensors 140 each include a Hall sensor. Optionally, the Hall sensor is coupled to a ferromagnetic flux concentrator that, for example, surrounds the respective electrical conductor 120, 121 and optionally includes a V-shaped tapered portion at the pointed end of which the Hall sensor is arranged.

For each tooth winding 12A-12C, a current sensor 140 is arranged at a first point X1 on the (first) electrical conductor 120. This (first) point X1 is located with respect to the electrical path between the end portion WA2 and the winding portion 122 closest to this end portion WA2 along the electrical path of the first electrical conductor 120. A further current sensor 140 is arranged at a (second) point X2 on the first electrical conductor 120. This (second) point X2 is located with respect to the electrical path between the end portion WA1 and the winding portion 122 closest to this end portion WA1 along the electrical path of the first electrical conductor 120. A further current sensor 140 is arranged at a (third) point X3 on the second electrical conductor 121. This (third) point X3 is located with respect to the electrical path between the end portion WB2 and the winding portion 122 closest to this end portion WB2 along the electrical path of the second electrical conductor 121. A further current sensor 140 is arranged at a (fourth) point X4 on the second electrical conductor 121. This (fourth) point X4 is located with respect to the electrical path between the end portion WB1 and the winding portion 122 closest to this end portion WB1 along the electrical path of the second electrical conductor 121.

Thus, with respect to the electrical paths, the winding portions 122 are each located between the current sensors 140. By determining a difference (in particular in comparison with a threshold value) of the current strengths detected by the current sensors 140 at the first point X1 and the second point X2 and/or corresponding to a difference between the third point X3 and the fourth point X4, the differential protection device may detect a turn short circuit and initiate a countermeasure.

It is also possible for the differential protection device to monitor the difference in current strengths between the first or second point X1, X2 on the one hand and the third or fourth point X3, X4 on the other (and compare it with a threshold value, for example), and to initiate a countermeasure based on this.

In the second and third tooth windings 12B, 12C, the current sensors 140 are arranged corresponding to the first tooth winding 12A.

Figure 6:
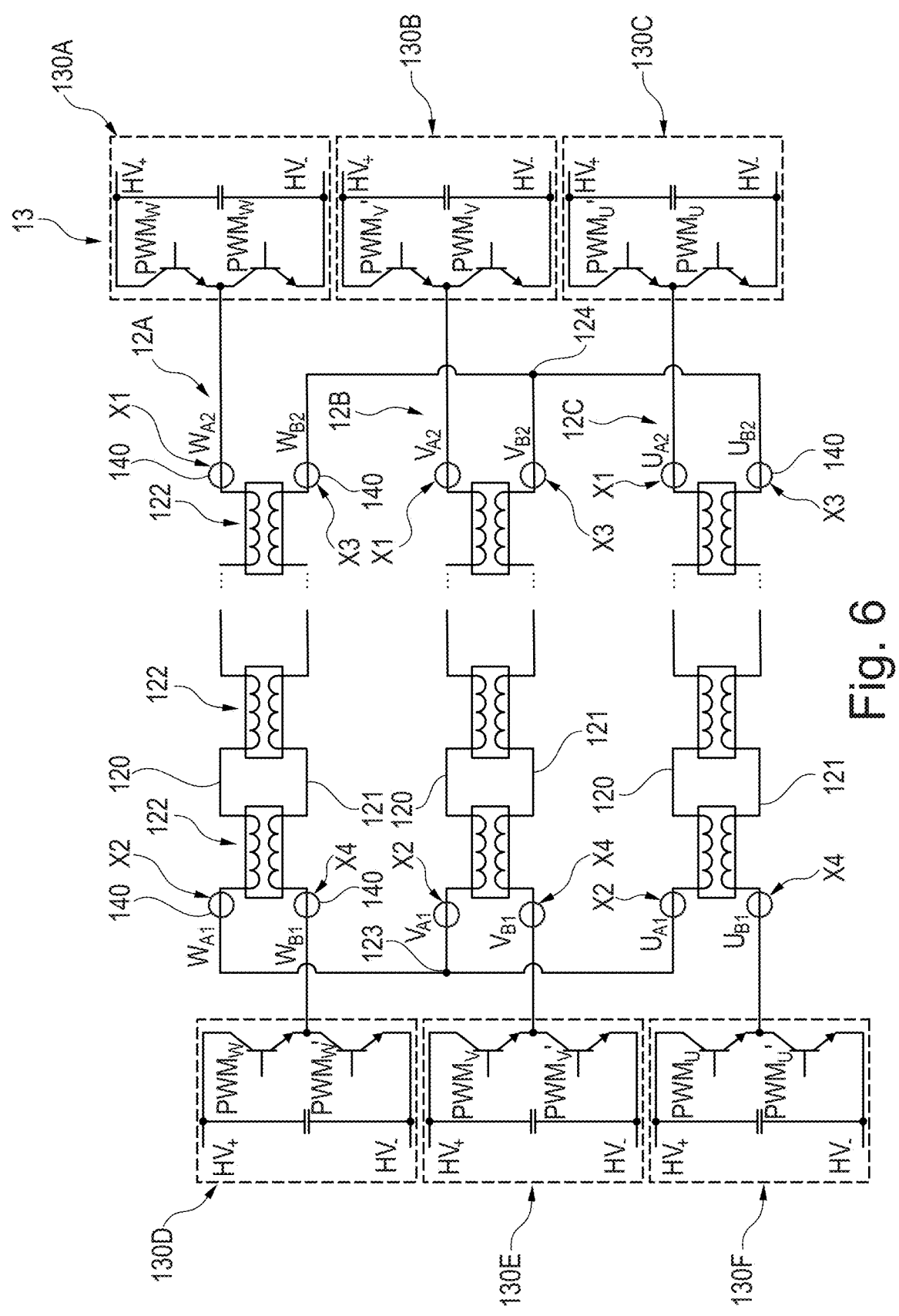

FIG. 6 shows substantially the same connection as FIG. 5, wherein more winding portions 122 are illustrated. It may be seen that the tooth windings 12A-12C may have a smaller or larger number of winding portions 122 depending on the application, e.g., in total six (cf. in particular FIGS. 2 and 5), twelve (cf. in particular FIG. 4), or 18.

While the tooth windings 12A-12C are arranged between the inverter units 130A-130F according to FIGS. 5 and 6, this arrangement is only exemplary.

Furthermore, it may be seen that in FIGS. 5 and 6 the end portions, connected to the inverter units 130A-130F, of the first and second conductors 120, 121 of each individual one of the tooth windings 12A-12C face away from one another with respect to the common winding portions 122.

Figure 7:
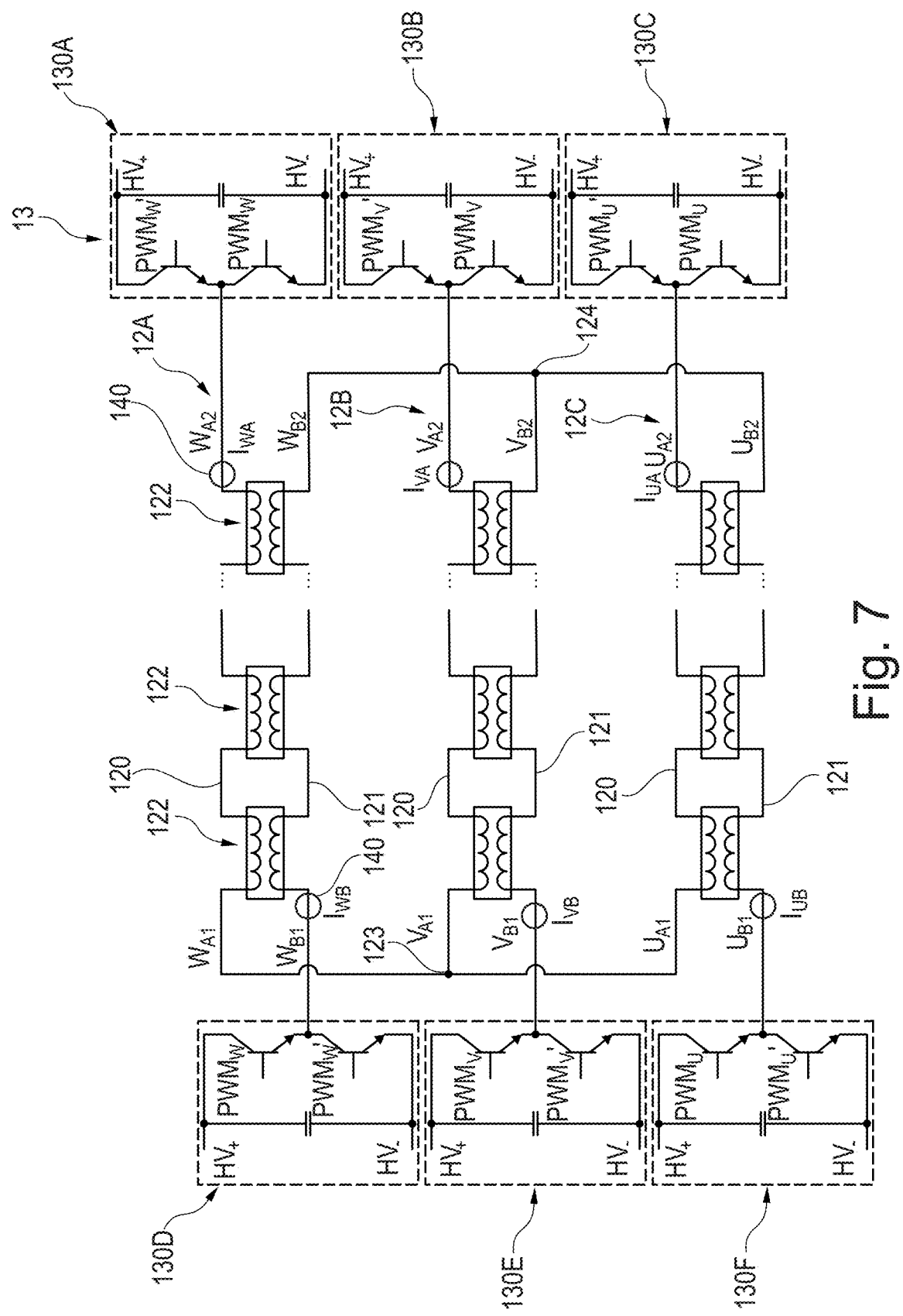
FIG. 7 depicts another schematic circuit diagram illustration of an example of tooth windings and inverter units of an inverter.

FIG. 7 shows a modified arrangement in which the currents are only measured at (exactly) one point per electrical conductor 120, 121 per phase. These currents are monitored, for example, with a three-phase or multi-phase differential protection. This differential protection forms, for example, the sum of the currents (in particular the total sum of all measured currents, alternatively in each case the sum of the two currents per phase) and triggers when the sum is no longer equal to zero (or in particular is no longer within a predetermined or predeterminable tolerance range around or at zero). Alternatively, a summation amplifier may be used and/or the current signals are recorded digitally, and the summation is performed in the inverter control system as described below in connection with FIG. 13.

As shown in FIG. 7, the one current sensor 140 per phase may be arranged at a first point on the first electrical conductor 120 and the other current sensor 140 of the respective phase may be arranged at a second point on the second electrical conductor 121. Here, as shown, the first and second points may be arranged at opposite ends of the respective electrical conductors 120, 121 with respect to the winding portions 122.

Figure 17:
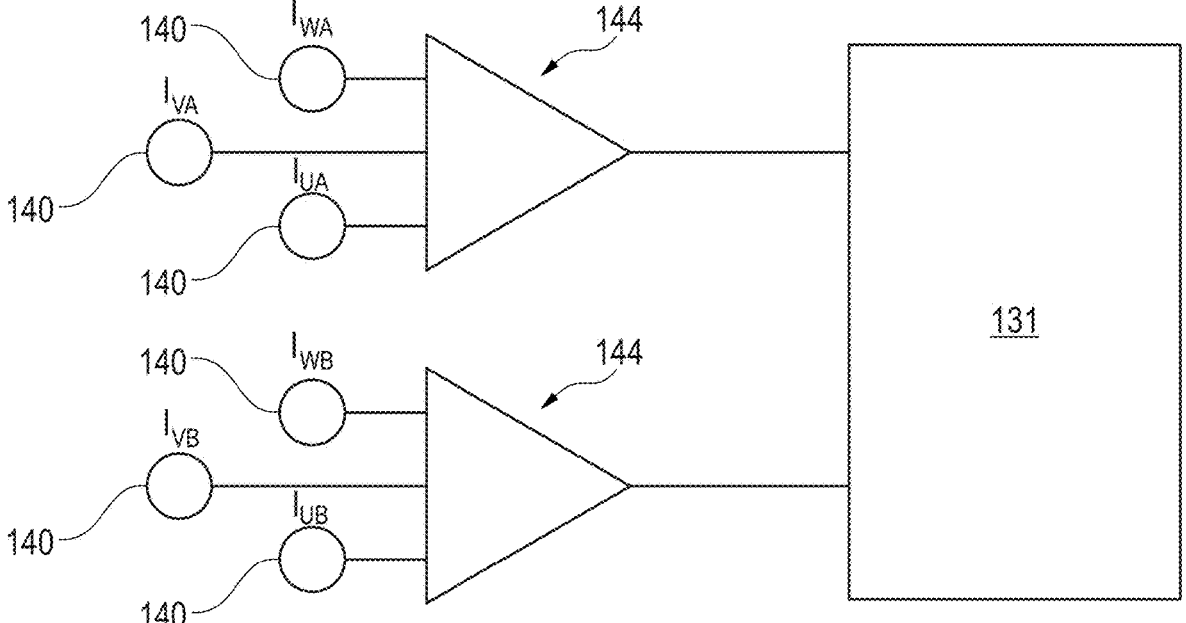
FIG. 17 depicts a block diagram of an example of a multi-phase differential protection.

FIG. 17 shows an optional multi-phase differential protection, e.g., for the arrangement according to FIG. 7. In this case, the current sensors 140 arranged on the first electrical conductors 120 are connected to a first adder 144. Furthermore, the current sensors 140 arranged on the second electrical conductors 121 are connected to a second adder 144. The first adder 144 adds up the measured currents of the current sensors 140 connected thereto. The second adder 144 adds up the measured currents of the current sensors 140 connected thereto. The control unit 131 compares the two sums thus obtained (and is configured accordingly for this purpose). Alternatively, a comparator may be connected between the adder 144 and the control unit 131, which performs the comparison and signals the result of the comparison to the control unit 131.

Figure 8:
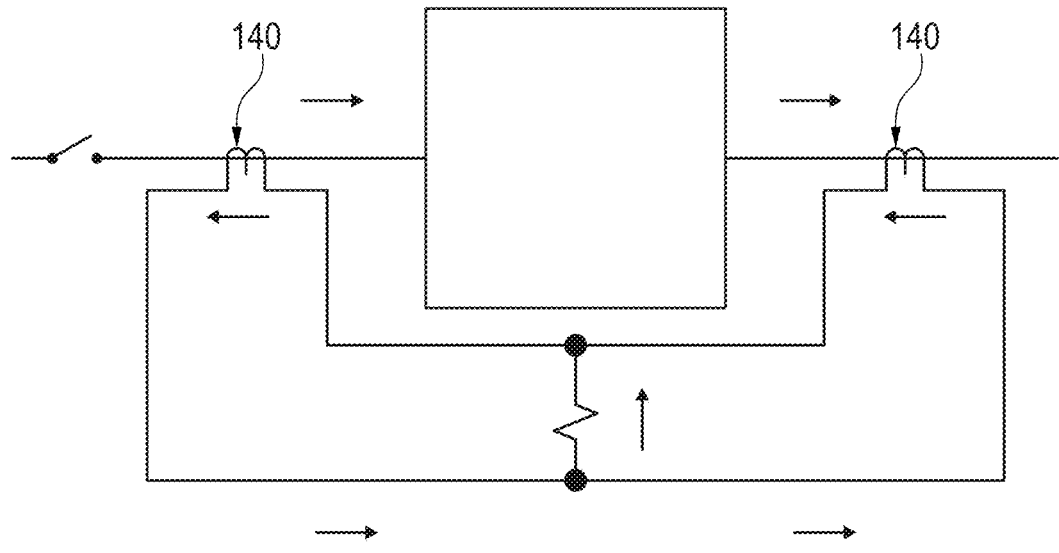
FIG. 8 depicts a circuit diagram of an example of a differential protection device.

FIG. 8 shows a general structure of a differential protection device, as may be provided in the stator 1. In certain examples, the differential protection device compares two current strengths measured at different points.

A component to be monitored is illustrated here by a block. In the present case, this is the part of the first electrical conductor 120 or the second electrical conductor 121 of one of the tooth windings 12A-12C between its respective end portions. The current sensors 140 are formed here as (optionally) single- or multi-wound wire portions arranged on the corresponding first/second electrical conductor, so that a current in the electrical conductor induces a current in the wire portion. The wire portions (or, e.g., the current sensors 140) are connected in series in a closed circuit. If the current strengths induced in both current sensors 140 are equal, then no current flows across a cross-connection between one and the other electrical connection of the current sensors 140. However, if a portion of the current flows through the monitored electrical conductor into the bifilar other electrical conductor, then there is a difference that results in a current in the cross-connection. This cross-current is monitored by the differential protection device and compared with a threshold value, for example. Based on this, a countermeasure may be initiated, e.g., an optional switch (e.g., in the form of a relay) may be opened in the electrical conductor.

Furthermore, as a countermeasure, a current introduced into the monitored electrical conductor 120, 121 may be changed, (e.g., reduced), by controlling the transistors of at least the inverter unit 130A-130F connected thereto in a changed manner based on the detection of a differential current. The transistors are controlled by signals, in the present case by pulse width modulated signals, which may also be referred to as PWM signals for short (pulse width modulation). The PWM signals alternate between two discrete values, e.g., "on" and "off", which open and close the corresponding transistor, respectively.

Figure 9:
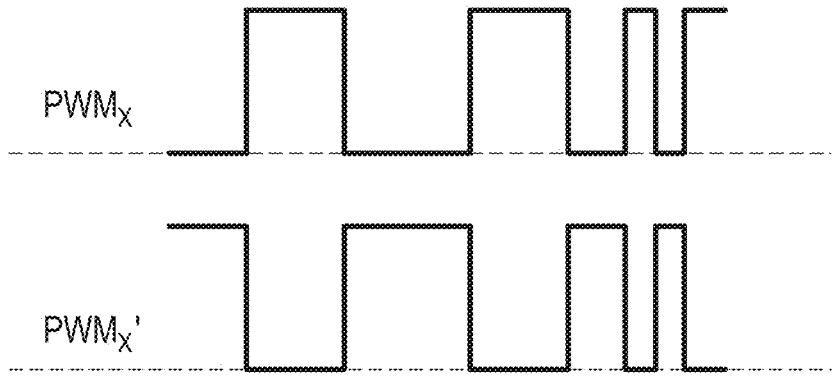
FIG. 9 depicts an example of switching signals for the inverter units.

FIG. 9 shows an example of such PWM signals, wherein X stands for the respective phase U, V, W. The PWM signals for the individual phases U, V, W are, e.g., the same, only shifted in time.

Furthermore, an inverted PWMX' signal is provided for each PWMX signal, which assumes a different discrete value in relation to the PWMX signal over time.

As illustrated, e.g., with reference to FIGS. 5 and 6, for each tooth winding 12A-12C, the reverse PWM signal PWMW', PWMV', PWMU' is applied to the transistor of the inverter unit 130A, 130B, 130C of the first electrical conductor 120 connected to the positive pole HV+ of the DC voltage. By contrast, the PWM signal PWMW, PWMV, PWMU' is applied to the transistor of the inverter unit 130A, 130B, 130C of the first electrical conductor 120 connected to the negative pole HV− of the DC voltage.

In the second electrical conductors 121, the PWM signals are applied in reverse. The PWM signal PWMW, PWMV, PWMU is applied to the transistor of the inverter unit 130D, 130E, 130F of the second electrical conductor 121 connected to the positive pole HV+ of the DC voltage. By contrast, the reverse PWM signal PWMW, PWMV, PWMU' is applied to the transistor of the inverter unit 130D, 130E, 130F of the second electrical conductor 121 connected to the negative pole HV− of the DC voltage.

It may therefore be seen that the same PWM signals are applied to the inverter units 130A-130C of the first electrical conductor 120 as to the inverter units 130D-130F of the second electrical conductor 121.

Figure 10:
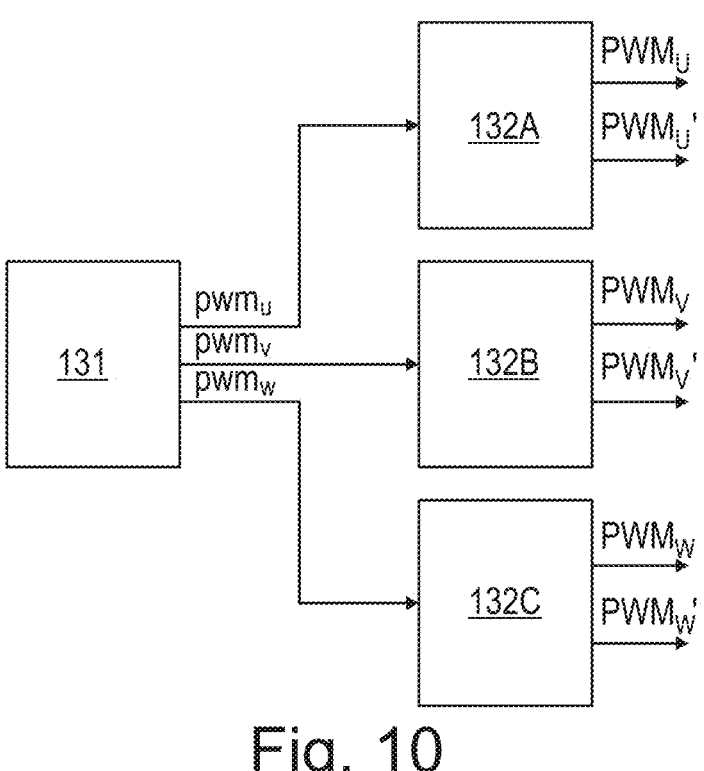
FIG. 10 depicts a block diagram of an example of components of the inverter.

FIG. 10 illustrates the generation of the PWM signals and the reverse PWM signals. The control unit 131 of the inverter generates signals for the three phases U, V, W, which are designated here as pwmu, pwmv, pwmw. These are each provided to a power electronics driver 132A-132C, which generates the PWM signals and the reverse PWM signals for the corresponding phase U, V, W based on them. The power electronics drivers 132A-132C are connected (e.g., electrically) to the inverter units 130A-130F of the respective phase U, V, W.

Figure 11:
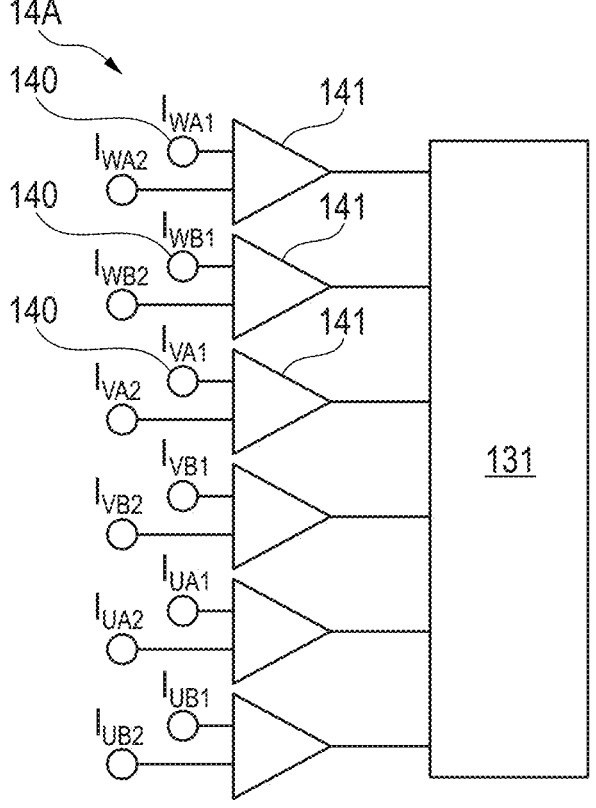
FIGS. 11 to 13 depict block diagrams of examples of components of differential protection devices for the tooth windings of FIGS. 5 to 7.

FIG. 11 shows the differential protection device 14A of the stator 1 according to FIG. 1. The differential protection device 14A includes the (total of 12) current sensors 140, wherein it would also be possible to provide only six current sensors 140 for the first electrical conductors 120 or only six current sensors 140 for the second electrical conductors 121. The other components shown in FIG. 5 are not shown again here merely for simplified visualization. Furthermore, the differential protection device 14A includes several comparators 141, in the present case six. Two current sensors 140 are connected to each comparator 141, which is shown here in simplified form by a line. For example, the current sensors 140 are each electrically connected to the respective comparator 141. The respective comparator 141 is connected to the current sensors 140 in such a way that the comparator 141 may detect the current signals provided thereby, which are indicative of the current strength in the corresponding electrical conductor 120, 121. The comparator 141 compares the current signals provided by the two current sensors 140 with each other and provides the comparison result as a difference signal to the control unit 131. If a predetermined condition is fulfilled, (e.g., if a differential signal exceeds or falls below a threshold value), the control unit 131 detects a fault.

There is no error as long as (within the scope of the measurement accuracy) the following applies to the current strengths: IUA1=IUA2; IUB1=IUB2; IVA1=IVA2; IVB1=IVB2; IWA1=IWA2; and IWB1=IWB2.

By detecting a current strength IUA1 (at point X2) unequal to a current strength IUA2 (point X1) and/or a current strength IUB1 (point X4) unequal to a current strength IUB2 (point X3) (or correspondingly for one of the other phases V, W), the control unit 131 detects a turn short circuit. If this applies to two phases simultaneously, the control unit 131 (optionally) detects a short circuit between two phases.

When a fault is detected, the control unit 131 optionally switches off all PWM signals (e.g., to zero). Optionally, the positive and or the negative pole HV+, HV− of the DC voltage source 3 are disconnected from the inverter units 130A-130F.

In the event of a short circuit between winding portions of the same phase, the control unit 131 optionally causes a three-phase short circuit.

The control unit 131 may thus detect whether (certain) first and second electrical conductors 120, 121 have a turn short circuit. In this case, the control unit 131 provides correspondingly modified PWM signals and reversed PWM signals.

The signals of the current sensors 140 at the first point X1 and at the second point X2 are connected to a comparator 141 (or, in certain examples, are compared with each other). Alternatively, or additionally (in particular for redundancy), the signals of the current sensors 140 at the third point X3 and at the fourth point X4 are connected to a further comparator 141 (or, in certain examples, are compared with each other).

Alternatively, the signals of the current sensors 140 are connected to a comparator 141 at the first point X1 and at the third point X3 (or, e.g., are compared with each other), and/or that the signals of the current sensors 140 are connected to a comparator 141 at the second point X2 and at the fourth point X4 (or, e.g., are compared with each other).

Figure 12:
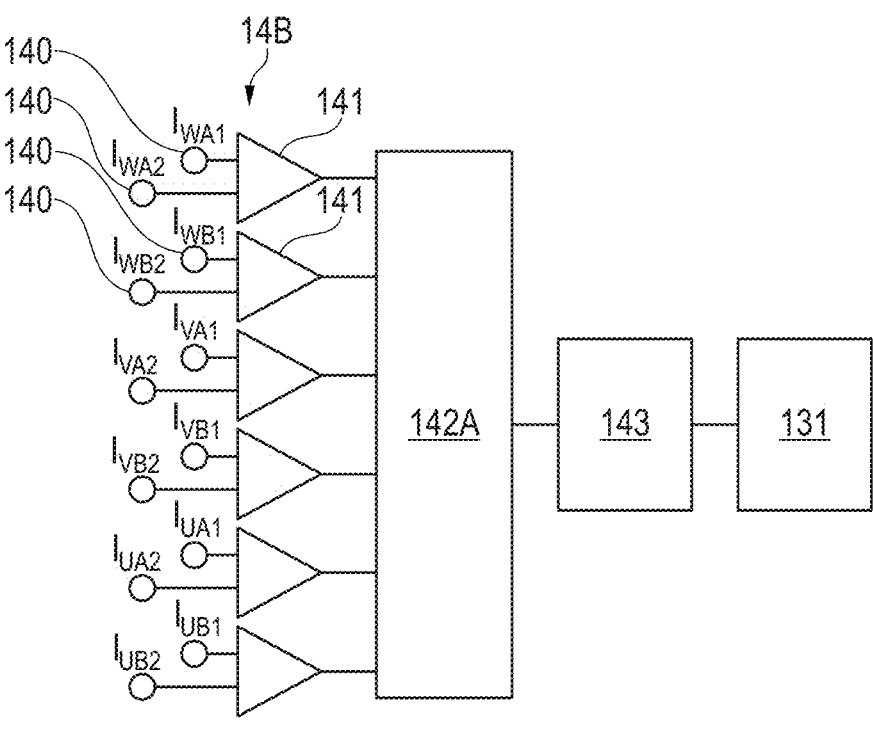

FIG. 12 shows a differential protection device 14B that may be provided on the stator 1 and may be connected to the circuit shown in FIG. 5, 6, or 7. As in FIG. 11, the current sensors 140 are connected to the comparators 141. However, these provide their differential signals to an analog multiplexer 142A. The multiplexer 142A provides the differential signal of the individual comparators at its output, e.g., in chronological sequence (with a fixed frequency). This output is connected to an analog-to-digital converter, ADC 143. The ADC 143 converts the analog signals from the comparators into digital signals. These digital signals are output to the control unit 131. The control unit 131 may carry out the comparison with a threshold value and output a logical "1" at its digital output if the value is above or below the threshold, otherwise output a logical "0". A logical "1" then indicates an error. In this way, the control unit 131 may detect whether there is a short circuit between the electrical conductors 120, 121.

Optionally, the multiplexer 142A, the ADC 143, and/or the control unit 131 are combined to form a microprocessor or SoC (system on a chip), e.g., an 8-bit flash microcontroller. The control unit 131 includes, for example, a vector control (field oriented control, FOC).

Figure 13:
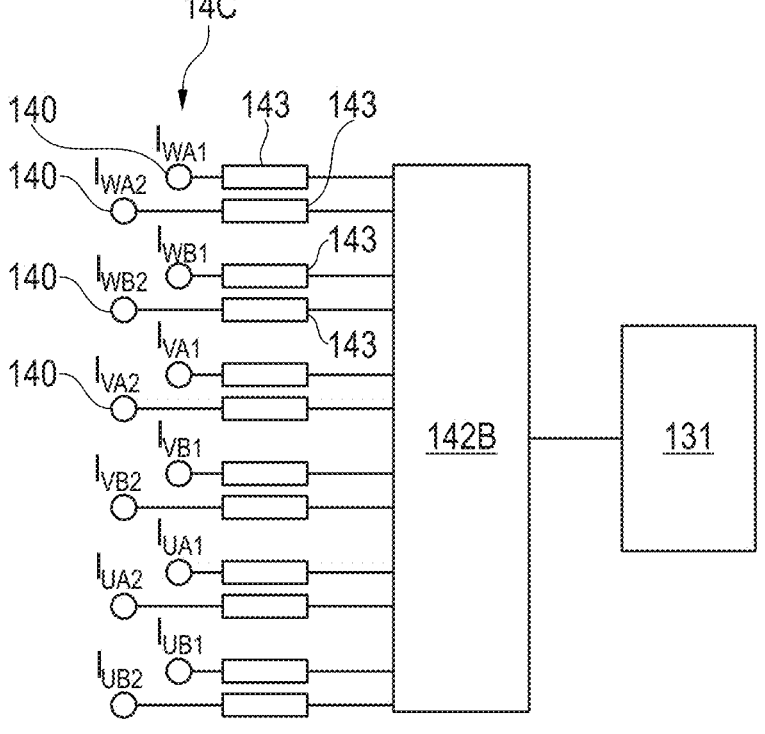

FIG. 13 shows a differential protection device 14B that may be provided on the stator 1 and may be connected to the circuit shown in FIG. 5, 6, or 7. According to FIG. 13, the current sensors are each connected to an ADC 143 of several (here 12) ADCs 143. The outputs of the ADCs 143 are connected to a digital multiplexer 142B, and its output is connected to the control unit 131.

Figure 14:
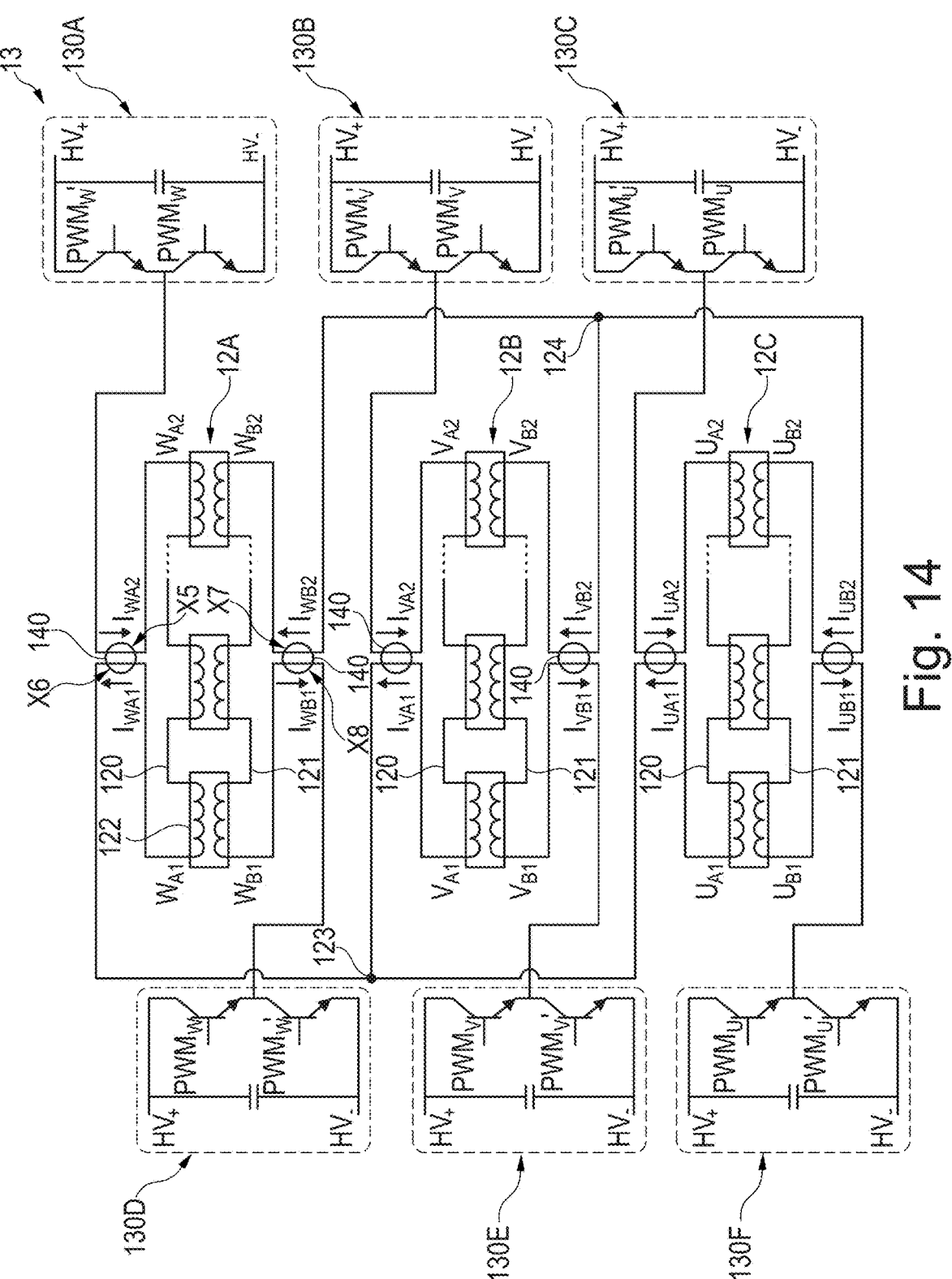
FIG. 14 depicts another schematic circuit diagram illustration of an example of tooth windings and inverter units of an inverter.

FIG. 14 shows substantially the same structure of the toothed windings 12A-12C and their connection to the inverter 13 as FIG. 6. In contrast, however, the portions of the electrical conductors 120, 121 between the end portions and the winding portions 122 are laid such that portions on either side of the winding portions 122 (with respect to the electrical path of the respective electrical conductors 120, 121) run adjacent to each other at one point (in particular, antiparallel with respect to the direction of current flow), e.g., abut each other. This makes it possible to use only one current sensor 140 per electrical conductor 120, 121. In the present case, six current sensors 140 are therefore sufficient for monitoring all six electrical conductors 120, 121 of the phases U, V, W.

A current through the first electrical conductor 120 at a (first) point X5 of the first electrical conductor 120 (each phase U, V, W) induces a current in a current sensor 140. A current through the first electrical conductor 120 at a (second) point X6 of the first electrical conductor 120 flows antiparallel in comparison with the other (first) point X5 and therefore induces a current in the same current sensor 140 with the opposite sign. If the current strengths at the two points X5, X6 are the same, the effectively induced current strength is zero. Thus, the current sensor 140 for measuring an effective differential current strength through the first conductor 120 is arranged at points X5, X6 of the first electrical conductor 120, which are electrically connected to each other via the winding portion 122.

Further, a current through the second electrical conductor 121 at a (third) point X7 of the second electrical conductor 121 (each phase U, V, W) induces a current in a further current sensor 140. A current through the second electrical conductor 121 at a (fourth) point X8 of the second electrical conductor 121 flows antiparallel in comparison with the other (third) point X7 and therefore induces a current in the same current sensor 140 with the opposite sign. If the current strengths at the two points X7, X8 are the same, the effectively induced current strength is zero. Thus, the current sensor 140 for measuring an effective differential current strength through the second electrical conductor 121 is arranged at points X7, X8 of the second electrical conductor 121, which are electrically connected to each other via the winding portion 122.

Figure 15:
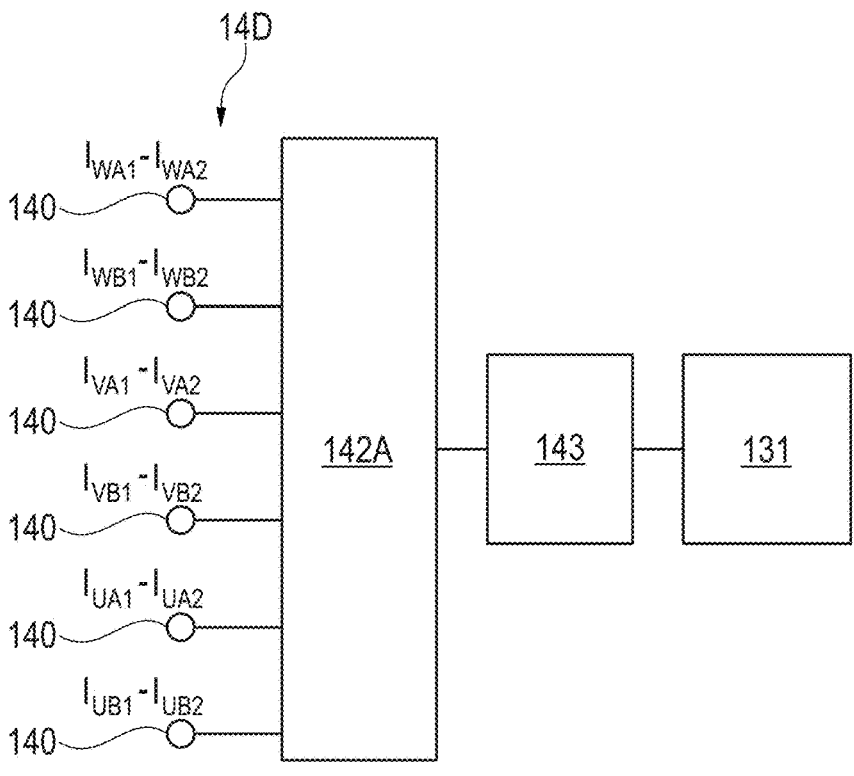
FIGS. 15 and 16 depict block diagrams of examples of components of differential protection devices for the tooth windings of FIG. 14.

FIG. 15 shows the corresponding differential protection device 14D that may be provided on the stator 1 and connected to the circuit shown in FIG. 14. The differential protection device 14D corresponds to the differential protection device 14B according to FIG. 12, wherein no comparators are required due to the current sensors 140 measuring the effective differential current strength.

Figure 16:
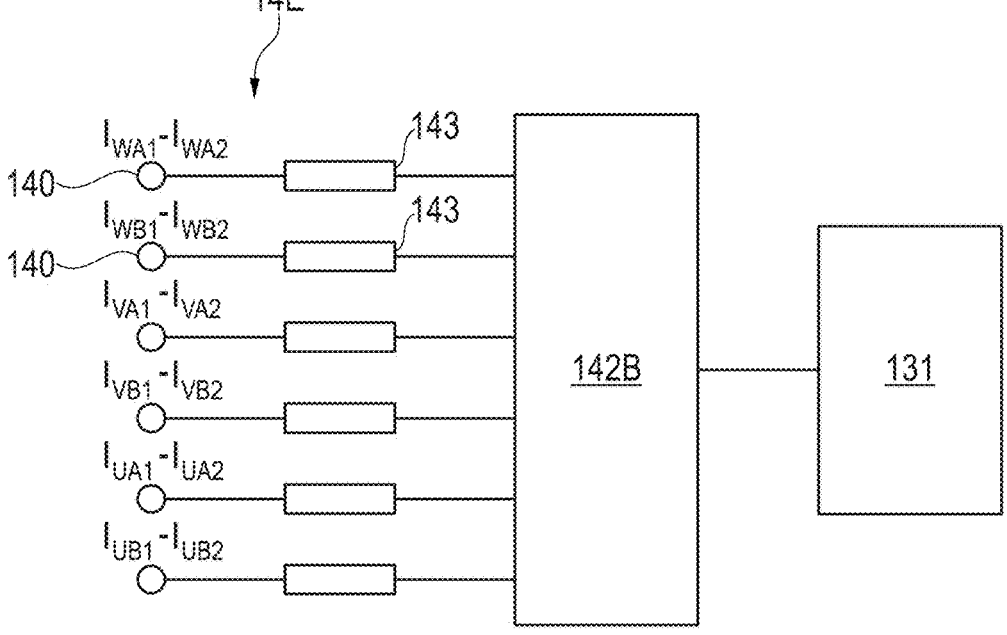

FIG. 16 shows a differential protection device 14E that may be provided on the stator 1 and may be connected alternatively to the circuit shown in FIG. 14. The differential protection device 14E corresponds to the differential protection device 14C according to FIG. 13, wherein only three (or, if redundant sensors are used as shown, six) ADCs 143 are required due to the current sensors 140 measuring the effective differential current strength.

The control unit 131 may initiate countermeasures. Alternatively, the error may first be displayed to a user, who may then activate one of the described countermeasures via an input device or mechanism.

Furthermore, the current sensors 140 adjacent to the inverter units 130A-130D may optionally be integrated into the respective inverter unit 130A-130D, for example, arranged in a housing of the inverter unit 130A-130D.

Figures 18, 19:
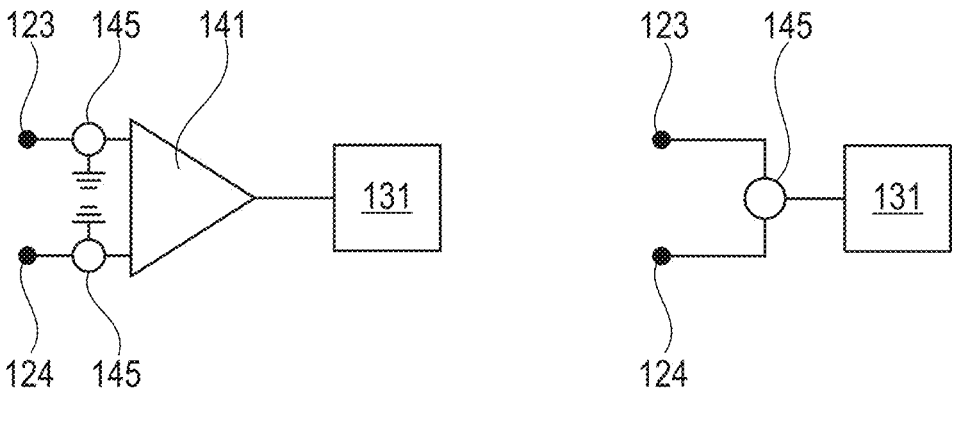
FIGS. 18 and 19 depict block diagrams of examples of arrangements for measuring voltage differences between star points, e.g. of one of the arrangements according to FIGS. 5-7 and 14.

Alternatively, or additionally, the voltage may be measured at the star points 123 and 124. These voltages may be compared with one or more comparators 141, for example, in each case in relation to an earth potential or another reference potential, as illustrated with reference to FIG. 18. The comparison result of the comparator 141 may be output to the control unit 131. Alternatively, or additionally, the voltage between the two star points 123, 124 may be measured by a voltage sensor 145. This voltage may be output to the control unit 131, as illustrated in FIG. 19.

Figure 20:
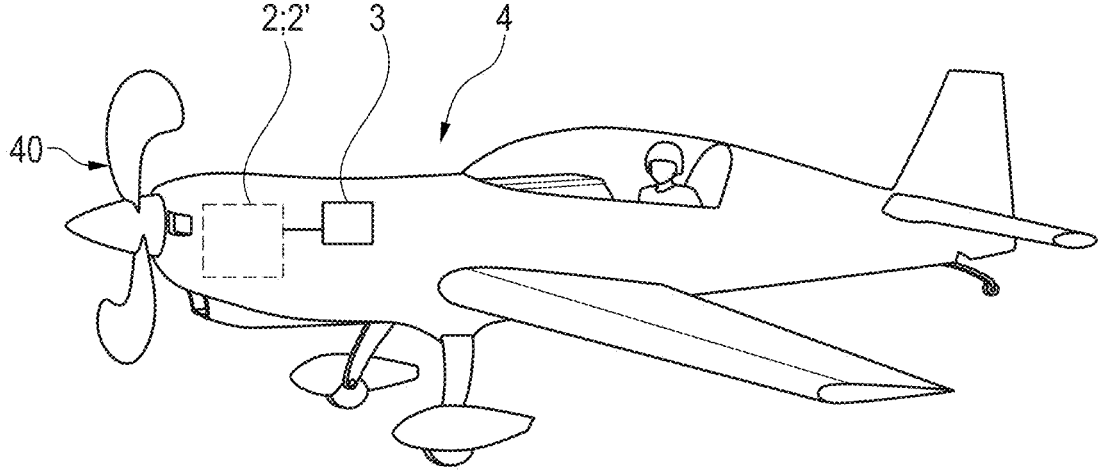
FIG. 20 depicts an example of an aircraft in the form of an airplane having an electrically driven propeller and the electric machine.

FIG. 20 shows an aircraft 4 in the form of an electrically driven airplane. The aircraft 4 includes a propeller 40 which is driven by the above-described electric machine 2 according to FIG. 2 (alternatively by the electric machine 2' according to FIG. 4).

The aircraft 4 furthermore includes an energy source 3 in the form of an electric battery. The electric machine 2 is supplied with energy by the energy source 3, wherein the energy source 3 is electrically connected to the inverter 13.

The disclosure is not limited to the embodiments described above, and various modifications and improvements may be made without departing from the concepts described here. Any of the features may be used separately or in combination with any other features, unless they are mutually exclusive, and the disclosure extends to and includes all combinations and sub-combinations of one or more features that are described herein.

It is to be understood that the elements and features recited in the appended claims may be combined in different ways to produce new claims that likewise fall within the scope of the present disclosure. Thus, whereas the dependent claims appended below depend on only a single independent or dependent claim, it is to be understood that these dependent claims may, alternatively, be made to depend in the alternative from any preceding or following claim, whether independent or dependent, and that such new combinations are to be understood as forming a part of the present specification.

While the present disclosure has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

LIST OF REFERENCE SIGNS

1 assembly, stator
10 body
11 stator tooth
12A-12C tooth winding
120 first electrical conductor
121 second electrical conductor
122 winding portion
123 first star point
124 second star point
13 inverter
130A-130F inverter unit
131 control unit
132A-132C power electronics driver
14A-14E differential protection device
140 current sensor
141 comparator
142A, 142B multiplexer
143 analog-digital converter 144 adder
145 voltage sensor
2; 2' electric machine
20 further assembly, rotor
3 energy source
4 aircraft
40 propeller
A winding axis
L air gap
N north pole
S south pole
U, V, W phase
X1-X8 point

The invention claimed is:

1. An assembly for an electric machine, the assembly comprising:
a body;
a plurality of stator teeth anchored on the body;
a plurality of tooth windings, wherein each tooth winding of the plurality of tooth windings has a first electrical conductor and a second electrical conductor, wherein at least one winding portion of the respective first electrical conductor and at least one winding portion of the respective second electrical conductor are wound along a winding axis around a same tooth and alternate in a direction of the winding axis;
a differential protection device with a plurality of sensors configured to detect a voltage on and/or a current strength through the first electrical conductor or the second electrical conductor at two or more points of a tooth winding of the plurality of tooth windings, wherein the differential protection device comprises: first current sensors and/or second current sensors, wherein first signals from the first current sensors are configured to be provided to a first comparator and/or second signals from the second current sensors are configured to be provided to a second comparator; and
a multiplexer configured to receive differential signals of a plurality of comparators comprising the first comparator and the second comparator.

2. The assembly of claim 1, wherein the first current sensors are arranged at points of the first electrical conductor electrically connected to one another via the at least one winding portion in order to measure the current strength through the first electrical conductor, and/or wherein the second current sensors are arranged at points of the second electrical conductor electrically connected to one another via the at least one winding portion in order to measure the current strength through the second electrical conductor.

3. The assembly of claim 2, wherein the first signals from the first current sensors are provided to the first comparator and/or the second signals from the second current sensors are provided to the second comparator.

4. The assembly of claim 1, wherein each electrical conductor of the first electrical conductor and the second electrical conductor of the tooth windings is electrically connectable or connected to an inverter.

5. The assembly of claim 1, wherein the plurality of tooth windings comprises three or more tooth windings, and
wherein each tooth winding of the three or more tooth windings is for one phase of a three-phase alternating current or a multi-phase alternating current.

6. The assembly of claim 1, wherein the first electrical conductor and/or the second electrical conductor of the plurality of tooth windings is/are electrically connected at one or more star points.

7. The assembly of claim 6, wherein the differential protection device further comprises one or more voltage sensors configured to measure a voltage at one star point or two star points and/or between the two star points.

8. The assembly of claim 1, wherein the first electrical conductor and the second electrical conductor of each tooth winding of the plurality of tooth windings are arranged in a bifilar manner at least on the at least one winding portion.

9. The assembly of claim 1, wherein each first electrical conductor of the first electrical conductors of the plurality of tooth windings runs around a plurality of teeth in each case, and
wherein each second electrical conductor of the second electrical conductors of the plurality of tooth windings runs around a same stator teeth in each case.

10. An assembly for an electric machine, the assembly comprising:
a body;
a plurality of stator teeth anchored on the body;
a plurality of tooth windings, wherein each tooth winding of the plurality of tooth windings has a first electrical conductor and a second electrical conductor, wherein at least one winding portion of the respective first electrical conductor and at least one winding portion of the respective second electrical conductor are wound along a winding axis around a same tooth and alternate in a direction of the winding axis; and
a differential protection device with a plurality of sensors configured to detect a voltage on and/or a current strength through the first electrical conductor or the second electrical conductor at two or more points of a tooth winding of the plurality of tooth windings,
wherein the differential protection device comprises a first current sensor that, in order to measure a differential current strength through the first electrical conductor, is arranged at points of the first electrical conductor electrically connected to one another via the at least one winding portion, and/or a second current sensor that, in order to measure a differential current strength through the second electrical conductor, is arranged at points of the second electrical conductor electrically connected to one another via the at least one winding portion.

11. The assembly of claim 10, wherein each electrical conductor of the first electrical conductor and the second electrical conductor of the tooth windings is electrically connectable or connected to an inverter.

12. The assembly of claim 10, wherein the plurality of tooth windings comprises three or more tooth windings, and
wherein each tooth winding of the three or more tooth windings is for one phase of a three-phase alternating current or a multi-phase alternating current.

13. The assembly of claim 10, wherein the first electrical conductor and/or the second electrical conductor of the plurality of tooth windings is/are electrically connected at one or more star points.

14. The assembly of claim 10, wherein the differential protection device further comprises one or more voltage sensors configured to measure a voltage at one star point or two star points and/or between the two star points.

15. The assembly of claim 10, wherein the first electrical conductor and the second electrical conductor of each tooth winding of the plurality of tooth windings are arranged in a bifilar manner at least on the at least one winding portion.

16. The assembly of claim 10, wherein each first electrical conductor of the first electrical conductors of the plurality of tooth windings runs around a plurality of teeth in each case, and wherein each second electrical conductor of the second electrical conductors of the plurality of tooth windings runs around a same stator teeth in each case.

17. An electric machine comprising:
an assembly; and
a further assembly,
wherein the assembly and the further assembly are rotatable relative to one another, and
wherein the assembly comprises:
   a body;
   a plurality of stator teeth anchored on the body;
   a plurality of tooth windings, wherein each tooth winding of the plurality of tooth windings has a first electrical conductor and a second electrical conductor, wherein at least one winding portion of the respective first electrical conductor and at least one winding portion of the respective second electrical conductor are wound along a winding axis around a same tooth and alternate in a direction of the winding axis; and
   a differential protection device with a plurality of sensors configured to detect a voltage on and/or a current strength through the first electrical conductor or the second electrical conductor at two or more points of a tooth winding of the plurality of tooth windings,
wherein the differential protection device comprises a first current sensor that, in order to measure a differential current strength through the first electrical conductor, is arranged at points of the first electrical conductor electrically connected to one another via the at least one winding portion, and/or a second current sensor that, in order to measure a differential current strength through the second electrical conductor, is arranged at points of the second electrical conductor electrically connected to one another via the at least one winding portion.

18. The electric machine of claim 17, wherein the assembly is a stator, and
   wherein the further assembly is a rotor.

19. The electric machine of claim 17, further comprising:
an inverter with a plurality of inverter units,
wherein an inverter unit of the plurality of inverter units is provided for one electrical phase of a multi-phase alternating voltage.

* * * * *